United States Patent Office 3,847,840
Patented Nov. 12, 1974

3,847,840
MANUFACTURE OF ION-EXCHANGING
SHAPED ARTICLES
Gerhard Kanig, Ludwigshafen, Germany, assignor to Badische Anilin- & Soda-Fabrik Aktiengesellschaft, Ludwigshafen (Rhine), Germany
No Drawing. Filed July 30, 1973, Ser. No. 383,893
Claims priority, application Germany, Aug. 2, 1970, P 22 37 953.9
Int. Cl. C08f 41/12
U.S. Cl. 260—2.1 E                              1 Claim

ABSTRACT OF THE DISCLOSURE

The manufacture of microporous ion-exchanging shaped articles, in particular fibers, fabrics and membranes, by mixing together (a) a polyolefin, (b) the particulate crosslinked polymer obtained by polymerizing a vinylaromatic compound in the presence of an aromatic divinyl compound in emulsion or suspension and (c) an inert solvent of low volatility, processing said mixture into a shaped article, removing said solvent and introducing ion-exhanging groups into said shaped article.

---

The present invention relates to a process for the manufacture of ion-exchanging shaped articles.

Cation exchangers based on polystyrene are well known. They are mainly produced by introducing ion-exchanging groups into styrene polymer beads. For example, the polymer produced in the granular polymerization of styrene is sulfonated. However, the prior art ion exchangers suffer from the drawback that, due to croslinking of the styrene polymer, they are no longer fusible and thus cannot be processed into filaments or film. Furthermore, the prior art ion exchangers as a rule only achieve a portion of their theoretical exchanging capacity and the rate of exchange is often unsatisfactory.

It is an object of the present invention to provide a process for the manufacturue of ion-exchanging shaped articles which are easier to handle, permit better utilization of their exchanging capacity and effect a more rapid rate of ion exchange than prior art ion exchanger.

We have found that this object may be achieved by mixing a particulate crosslinked polymer obtained by dispersion polymerization of styrene, a styrene derivative, acenaphthylene or a mixture of said monomers in the presence of from 1 to 20% by weight, based on styrene or styrene derivative, of an aromatic divinyl compound, with an olefin polymer and introducing ion-exchanging groups in a conventional manner into said mixture after it has been shaped.

By shaped articles we mean fibers, fabrics, non-woven fabrics, granules, beads, membranes, films and articles of various shapes.

By styrene derivatives we mean substituted styrene such as methylstyrene. Also suitable are acenaphthylene and copolymers of styrene and methylstyrene, styrene and stilbene, styrene and acenaphthylene and copolymers of styrene containing polymerized units of more than one of said comonomers. Only those polymers are suitable for the process of the invention which have been made by dispersion polymerization of styrene or styrene derivatives in the presence of an aromatic divinyl compound. Suitable aromatic divinyl compounds are mainly 1,2-divinylbenzene, 1,3-divinylbenzene and 1,4-divinylbenzene and mixtures thereof. The divinyl compound is used in amounts of from 1 to 20%, preferably from 5 to 15%, by weight, based on styrene or styrene derivative.

The dispersion polymerization of styrene and styrene derivatives is well known (cf. D. Braun, H. Cherdron, W. Kern, Praktikum der makromolekularen organischen Chemie, 2nd Edition, 1971, published by Dr. Alfred Hüthig Verlag, Heidelberg, pp. 66–79). By emulsion polymerization we mean polymerization in suspension or in emulsion. The suspension polymerization is controlled so as to give particles having a diameter of not more than 0.1 mm. The particles formed by emulsion polymerization have a diameter of less than $1\mu$, usually between 0.1 and $0.5\mu$. Particularly suitable particles for use in the present invention are those of very small diameter. It is therefore, possible to use particles having a diameter of less than $0.1\mu$.

Since the dispersion polymerization is carried out in the presence of an aromatic divinyl compound, crosslinked polymer particles are obtained. Dispersion polymerization is carried out using conventional initiators such as free-radical compounds and redox systems. This polymerization is usually carried out at temperatures of between 60° and 90° C. Isolation of the crosslinked polymer is also carried out by conventional methods, for example by precipitation or freezing out the particulate polymer. The resulting particulate crosslinked polymer is dried and then mixed with a polyolefin at elevated temperatures.

Suitable polyolefins are polymers of olefins having from 2 to 6 carbon atoms and the corresponding fluorinated olefins. In general, those olefin polymers are suitable which show no change or only insignificant change when ion-exchanging groups are introduced into the crosslinked styrene polymer. Particularly suitable are polyethylene, polypropylene, polybutene-1, poly - 4 - methylpentane-1, polyisobutylene and ethylene/propylene, ethylene/butene-1 and ethylene/isobutylene copolymers. It is also possible to use mixtures of said polymers, for example 2:1 mixtures of polyethylene and polyisobutylene or 1:1 mixtures of polyethylene and polypropylene. The melt index of the olefin polymer (as measured according to DIN 53,735) is between 0.1 and 50 and preferably between 0.1 to 8 g./10 minutes. The mixtures of crosslinked particulate polystyrene or polystyrene derivative contains from 40 to 90%, preferably from 50 to 80%, by weight of an olefin polymer or olefin polymer mixture.

In a preferred embodiment of the process of the invention, the particulate crosslinked polystyrene or poly(styrene derivative) is mixed with the polyolefin in the presence of an inert solvent of low volatility at temperatures sufficiently high to cause melting thereof (e.g. 200° C.). The solvents used are mainly substances which show no appreciable evaporation when the mixtures are shaped, for example when they are spun into monofilaments. Particularly suitable solvents are tetrahydronaphthalene, decahydronaphthalene, anthracene, acenaphthene, diphenyl, saturated $C_{10-40}$ hydrocarbons, esters of adipic acid with alcohols of from 1 to 20 carbon atoms, paraffin oil, camphor and phthalate derived from alcohols of from 1 to 20 carbons, oleic acid, stearic acid and palmitic acid. The solvent may be used in an amount of up to 90%, preferably in an amount of from 20 to 50%, by weight, based on the polymer mixture. The inert solvent may be removed from the mixture before or after shaping, e.g. by washing with a volatile solvent which is a non-solvent for the polyolefin and crosslinked polystyrene. Suitable volatile solvents are for example methanol, acetone and light naphtha. The shaped articles thus obtained are microporous. A sufficient degree of microporosity in the shaped articles is achieved when only 5% by weight of inert solvent of low volatility, based on the polymer mixture, is used.

The mixtures are used to make preferably fibers, fabrics and membranes. Fibers having particularly advantageous properties are obtained for example from mixtures consisting of from 20 to 50% by weight of polystyrene crosslinked with divinylbenzene and from 80 to 50% by weight of polypropylene. Although the mixture contains a considerable amount of crosslinked polystyrene, it is possible to make fibers of satisfactory quality therefrom. The mixtures may also contain conventional additives such as dyes, stabilizers and small amounts of inert fillers.

According to the present invention, ion-exchanging shaped articles are obtained by introducing ion-exchanging groups in a conventional manner into the fibers, fabrics, membranes or granules prepared from the above mixtures (cf. D. Braun, H. Cherdron, W. Kern, Praktikum der makromolekularen organischen Chemie, 2nd Edition, 1971, published by Dr. Alfred Hüthig Verlag, Heidelberg, pp. 293–298). For example, to obtain a cation-exchanging fiber, the fiber is sulfonated. An anion-exchanging fiber may be obtained, for example, by subjecting the fiber to chloromethylation followed by amination.

The ion-exchanging shaped articles produced by the present invention are used, for example, for softening water and removing metal ions from aqueous solutions. It is particularly advantageous to use fibers or fabrics made of said ion-exchanging mixtures, as these, unlike particulate ion exchangers, may be readily removed from the aqueous phase when the exchange of ions has taken place.

The present invention is further illustrated by the following Examples in which parts are by weight.

EXAMPLE 1

Particulate crosslinked polystyrene is produced by polymerizing styrene in the presence of 8% by weight of divinylbenzene in emulsion, as described by D. Braun, H. Cherdron and W. Kern, Praktikum der makromolekularen organischen Chemie, 2nd Edition, 1971, published by Dr. Alfred Hüthig Verlag, Heidelberg, p. 138. The addition of divinylbenzene produces an emulsion of particulate crosslinked polystyrene. The emulsion is cooled to such an extent that the water freezes. On thawing, the particles coagulate. The particulate polymer is filtered off and dried. The diameter of the crosslinked polystyrene particles is between 0.05 and 0.5$\mu$. A portion of the particulate crosslinked polystyrene is then mixed with 2 parts of polyethylene having a density of 0.96 g./ccm. and a melt index of 5 g./10 minutes, at 200° C. in the presence of 10 parts of tetrahydronaphthalene. When a homogeneous mixture is obtained, from 8 to 9 parts of tetrahydronaphthalene are distilled off and the melt is spun to form a fiber having a diameter of 0.05 mm. The remaining tetrahydronaphthalene is then removed from the fiber with boiling methanol to give a porous polyethylene fiber. A cation-exchanging fiber is obtained by introducing ion-exchanging groups into the fiber by sulfonation thereof with concentrated sulfuric acid (cf. D. Braun, H. Cherdron, W. Kern, Praktikum der makromolekularen organischen Chemie, 2nd Edition, 1971, published by Dr. Alfred Hüthig Verlag, Heidelberg, p. 295).

The cation-exchanging fiber produced by the present invention effects decoppering of a dilute copper tetramine sulfate solution, for example, 5 times quicker than the same weight of a commercial cation-exchanger in the form of beads.

EXAMPLE 2

1 part of particulate crosslinked polystyrene prepared as described in Example 1 is uniformly distributed in 2 parts of paraffin oil heated to a temperature of 200° C. To this mixture there is added, at 200° C., 2 parts of polypropylene having a melt index of 0.8 g./10 minutes, and the whole is homogenized. The mixture is then melt-spun to form a fiber having a diameter of 0.05 mm. The molten material may alternatively be processed into other shaped articles such as films or granules. The fiber is then treated with boiling acetone to remove the excess inert solvent (paraffin oil). The resulting fiber is sulfonated. 1 g. of the thus prepared cation-exchanging fiber reduces the degree of hardness of 300 ccm. of water, for example, from 20° (German hardness) to 12° five times quicker than 1 g. of a commercial cation exchanger in the form of beads.

EXAMPLE 3

The mixture described in Example 2 is melt-spun into a fiber which is then subjected to chloromethylation followed by amination in a conventional manner (cf. D. Braun, H. Cherdron, W. Kern, Praktikum der makromolekularen organischen Chemie, 2nd Edition, 1971, published by Dr. Alfred Hüthig Verlag, Heidelberg, p. 295). There is obtained an anion-exchanging fiber which effects ion exchange five times quicker than similar commercial products in the form of beads.

I claim:
1. A process for the manufacture of microporous ion-exchanging shaped articles which comprises mixing together (a) a polyolefin selected from the group consisting of polyethylene, polypropylene, polybutene-1, poly-4-methyl-1-pentene, polyisobutylene, a nethylene/propylene copolymer, an ethylene/butene-1 copolymer, an ethylene/isobutylene copolymer and mixtures thereof, (b) the particulate crosslinked polymer obtained by polymerizing a monomer selected from the group consisting of styrene, a styrene derivative, acenaphthylene and mixtures thereof in emulsion or suspension in the presence of an aromatic divinyl compound selected from the group consisting of 1,2-divinylbenzene, 1,3-divinylbenzene, 1,4-divinylbenzene and mixtures thereof and (c) an inert solvent of low volatility, processing the resulting mixture into a shaped article, removing said solvent of low volatility therefrom and introducing ion-exchanging groups into said shaped article.

References Cited
UNITED STATES PATENTS
| | | |
|---|---|---|
| 2,681,319 | 6/1954 | Bodamer. |
| 2,681,320 | 6/1954 | Bodamer. |
| 3,627,703 | 12/1971 | Kojima et al. |

FOREIGN PATENTS
| | | |
|---|---|---|
| 1,201,055 | 9/1965 | Germany. |

MELVIN GOLDSTEIN, Primary Examiner

U.S. Cl. X.R.

260—2.2 R, 2.5 HB, 2.5 HA

UNITED STATES PATENT AND TRADEMARK OFFICE
CERTIFICATE OF CORRECTION

PATENT NO. : 3,847,840
DATED : November 12, 1974
INVENTOR(S) : Gerhard Kanig

It is certified that error appears in the above-identified patent and that said Letters Patent are hereby corrected as shown below:

Column 1, line 8, "1970" should read --1972--.

Column 2, line 36, "mixtures" should read --mixture--.

Column 4, line 34, "a nethylene" should read --an ethylene--.

Signed and sealed this 15th day of July 1975.

(SEAL)
Attest:

RUTH C. MASON
Attesting Officer

C. MARSHALL DANN
Commissioner of Patents
and Trademarks